United States Patent
Purwin et al.

(10) Patent No.: US 7,730,228 B2
(45) Date of Patent: **\*Jun. 1, 2010**

(54) SYSTEM FOR DUAL USE OF AN I/O CIRCUIT

(75) Inventors: Charles J. Purwin, Litchfield, NH (US); Chris R. Franklin, Merrimack, NH (US)

(73) Assignee: Broadcom Corporation, Irvine, CA (US)

( \* ) Notice: Subject to any disclaimer, the term of this patent is extended or adjusted under 35 U.S.C. 154(b) by 0 days.

This patent is subject to a terminal disclaimer.

(21) Appl. No.: 12/243,552

(22) Filed: Oct. 1, 2008

(65) Prior Publication Data

US 2009/0031050 A1    Jan. 29, 2009

Related U.S. Application Data

(63) Continuation of application No. 11/000,380, filed on Dec. 1, 2004, now Pat. No. 7,451,245.

(51) Int. Cl.
*G06F 3/00* (2006.01)
*G06F 13/00* (2006.01)

(52) U.S. Cl. .......................... 710/12; 710/316; 710/240

(58) Field of Classification Search ............... 710/8–18, 710/29–31, 316–317, 240
See application file for complete search history.

(56) References Cited

U.S. PATENT DOCUMENTS

| | | | |
|---|---|---|---|
| 6,076,142 A | 6/2000 | Corrington et al. | |
| 6,259,532 B1 | 7/2001 | Yaple et al. | |
| 6,847,335 B1 | 1/2005 | Chang et al. | |
| 6,961,797 B2 | 11/2005 | Yu et al. | |
| 7,451,245 B2 | 11/2008 | Purwin et al. | |
| 2003/0154331 A1 | 8/2003 | Bader et al. | |
| 2004/0039873 A1 | 2/2004 | Lin | |
| 2005/0210171 A1 | 9/2005 | Tanaka et al. | |
| 2006/0114177 A1 | 6/2006 | Purwin et al. | |

OTHER PUBLICATIONS

"DS2411: Silicon Serial No. with $V_{cc}$ Input," http://pdfserv.maxim-ic.com/en/ds/DS2411, Dallas Semiconductor: Maxim, last updated Dec. 21, 2006, 11 pages.

*Primary Examiner*—Christopher B Shin
(74) *Attorney, Agent, or Firm*—Sterne, Kessler, Goldstein & Fox, PLLC

(57) ABSTRACT

A system provides dual use of a general purpose input/output (I/O) line. In an embodiment, the system comprises a controlling circuit having a dual purpose I/O line that is selectively operable in a serial transmit mode or an I/O mode. A first circuit that receives a serial data stream when the controlling circuit operates in the serial transmit mode is coupled to the I/O line. A second circuit that generates and transmits a signal when the controlling circuit operates in the I/O mode is also coupled to the I/O line. Finally, a third circuit is disposed between the second circuit and the I/O line. In an embodiment, when the controlling circuit operates in the serial transmit mode, the third circuit maintains the second circuit in an idle state, and when the controlling circuit operates in the I/O mode, the third circuit permits the second circuit to transmit the signal to the controlling circuit.

20 Claims, 2 Drawing Sheets

SYSTEM FOR DUAL USE OF AN I/O CIRCUIT

This is a continuation application of pending U.S. application Ser. No. 11/000,380, filed Dec. 1, 2004, now allowed, which is herein incorporated by reference in its entirety.

BACKGROUND OF THE INVENTION

1. Field of the Invention

The invention relates to improvements in circuit design in the field of general purpose input/output (I/O) line usage. More specifically, the invention allows a general purpose I/O line to selectively support different functions, while avoiding interference between those functions.

2. Background Art

Electronic devices typically communicate with other external electronic devices or circuits. To support such communication, electronic devices often have a finite number of general purpose I/O (GPIO) lines. GPIO lines are external communication nodes capable of bidirectional data transfer with external electronic devices or circuits. Such communication nodes take up valuable chip space and increase design and testing costs. Designers must therefore carefully anticipate the number of external devices that are expected to interface with a particular electronic device to ensure a sufficient number of GPIO lines.

Typically, a single GPIO line will serve a single external device. A single dedicated use for a GPIO line simplifies chip and software design, and avoids interference that may occur if the GPIO line is used by a plurality of devices. However, lack of foresight or new technical requirements may result in more external devices than there are GPIO lines. Accordingly, there is a need for improvements in circuit designs in the field of GPIO line usage.

BRIEF SUMMARY OF THE INVENTION

Additional features and advantages of the invention will be set forth in the description that follows, and in part will be apparent from the description, or may be learned by practice of the invention.

A system provides dual use of an input/output (I/O) line. In an exemplary embodiment, a controlling circuit has a dual purpose I/O line that is selectively operable in a serial transmit mode or an I/O mode. A first circuit, which receives a serial data stream when the controlling circuit operates in the serial transmit mode, is coupled to the I/O line. A second circuit, which generates and transmits a signal when the controlling circuit operates in the I/O mode, is also coupled to the I/O line. Finally, a third circuit is disposed between the second circuit and the I/O line. In an embodiment, when the controlling circuit operates in the serial transmit mode, the third circuit maintains the second circuit in an idle state, and when the controlling circuit operates in the I/O mode, the third circuit permits the second circuit to transmit the signal to the controlling circuit.

It is to be understood that both the foregoing general description and the following detailed description are exemplary and explanatory and are intended to provide further explanation of the invention as claimed. Neither the Summary of the Invention nor the Detailed Description are intended to limit the scope of the invention beyond what is claimed.

BRIEF DESCRIPTION OF THE DRAWINGS/FIGURES

The accompanying drawings, which are included to provide a further understanding of the invention and are incorporated in and constitute part of this specification, illustrate embodiments of the invention. Together with the description, they serve to provide examples of implementation of the invention. In the drawings.

Figure 1:
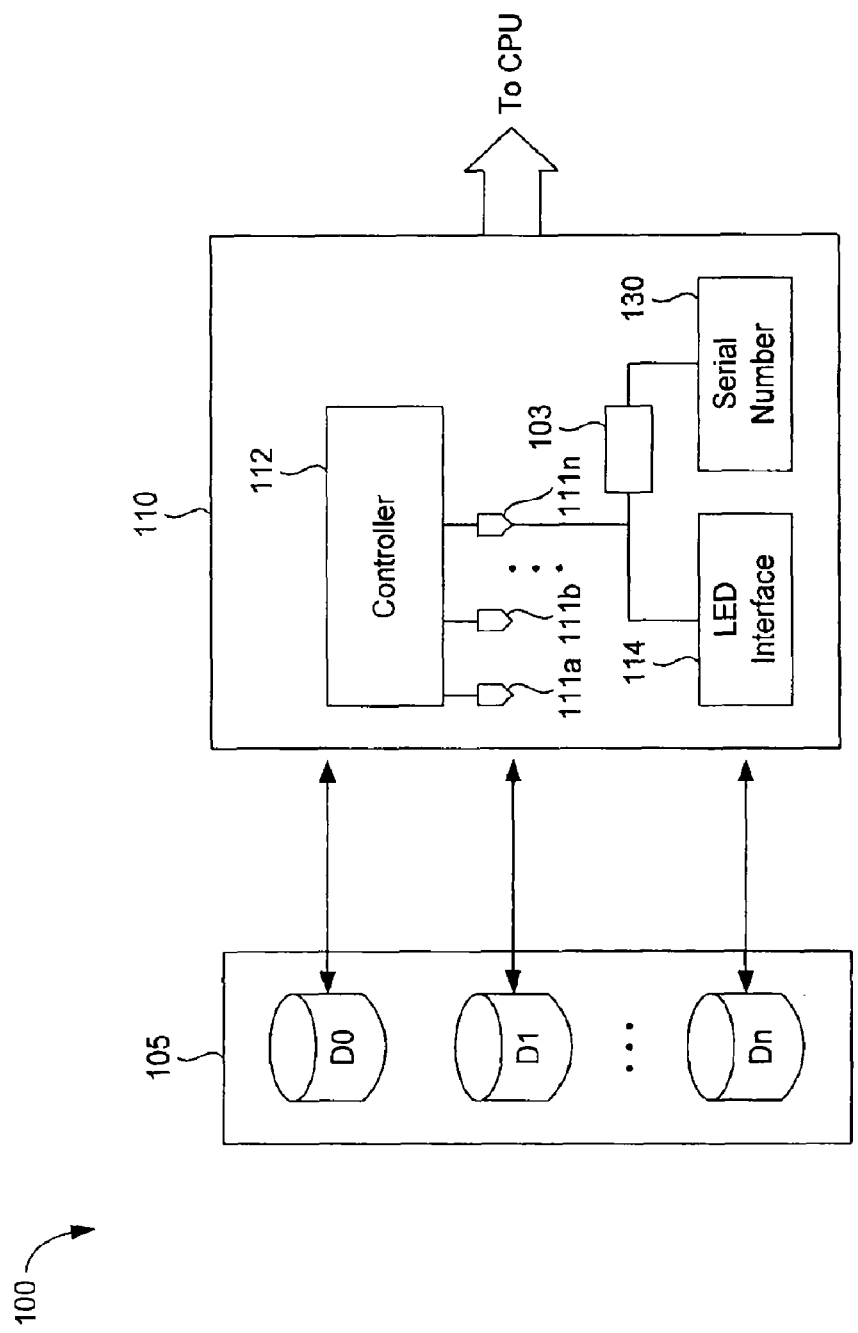
FIG. 1 illustrates an environment in which the present invention may be implemented.

The present invention will now be described with reference to the accompanying drawings. In the drawings, like reference numbers indicate identical or functionally similar elements. Additionally, the leftmost digit or digits of a reference number identify the figure in which the reference number first appears.

DETAILED DESCRIPTION OF THE INVENTION

While the present invention is described herein with reference to illustrative embodiments for particular applications, it should be understood that the invention is not limited thereto. Those skilled in the art with access to the teachings provided herein will recognize additional modifications, applications, and embodiments that fall within the scope of the claims, and additional fields in which the invention would be of significant utility.

Adding an additional general purpose input/output (GPIO) line to a chip is costly, and, in many cases, impractical. It may, therefore, be necessary for more than one external device to share a GPIO line. In cases where a GPIO line must selectively service two or more electronic devices, the devices must be coupled to the GPIO line so that they do not interfere with each other. For example, a typical task performed by a GPIO line is serial data transmission to an external device—e.g., transmission of LED control signals to an external LED display. Alternatively, a GPIO line may need to communicate with an external device, such as a silicon serial number chip. It would be beneficial, then, to enable a GPIO line to selectively carry out both functions, without one function hampering the performance of the other.

The present invention is directed generally to a system that allows dual use of an input/output line. In an embodiment, an electronic device implementing such a system can use a GPIO line to selectively transmit data to a first circuit or communicate with a second circuit, according to the needs of a controlling circuit.

FIG. 1 illustrates an exemplary system 100 to which concepts of the present invention may be applied. FIG. 1 includes a redundant array of inexpensive disks (RAID) array 105 coupled to a printed circuit board 110. Printed circuit board 110 is, in turn, coupled to a central processing unit (CPU) that uses RAID array 105. The individual disks in RAID array 105 are shown by disks D0 through Dn. A RAID array is a commonly used, inexpensive memory subsystem that provides high performance, redundant, data storage capability. As described more fully below, an embodiment of the present invention is implemented in the relationships between the individual circuits on printed circuit board 110.

Still referring to FIG. 1, printed circuit board 110 contains a controlling circuit embodied by RAID controller 112. RAID controller 112 has a limited number of GPIO lines 111a-111n, through which external electronic devices or circuits may be coupled. Printed circuit board 110 contains a number of such external devices or circuits that are coupled to RAID controller 112. For example, a first external circuit for receiving data transmitted by RAID controller 112 is embodied by LED interface 114. As shown in FIG. 1, LED interface 114 is coupled to RAID controller 112 at GPIO line 111n. An LED interface circuit is described in a co-pending application entitled "System and Method for Driving Multiple Display Types Using a Single Header Block," filed Dec. 1, 2004 by the same inventors and assigned to the same assignee, application Ser. No. 11/000,332, the entire specification of which is incorporated herein by reference.

The data transmitted by RAID controller 112 to LED interface 114 comprises serially transmitted LED control signals representing the status of the individual disks D0 through Dn that make up RAID array 105. LED interface 114, in turn, drives an LED array (not shown) that visually represents the status of disks D0 through Dn. In conventional circuits, a device such as the above noted LED interface circuit typically has a single output line dedicated to it, through which it receives LED control signals from RAID controller 112.

A second external circuit that is in communication with RAID controller 112 is exemplified by serial number circuit 130. Serial number circuit 130 is also coupled to RAID controller 112 via GPIO line 111n. An exemplary silicon based serial number chip is the DS2411 device made by Dallas Semiconductor Corp., 4401 South Beltwood Parkway, Dallas, Tex. 75244. The DS2411 is a low cost electronic registration number chip requiring an external power supply. It provides a unique identity that can be determined with a minimal electronic interface. Data is transferred serially from the chip via a single wire connection. The specification sheet for the DS2411 chip is available at http://pdfserv.maxim-ic.com/en/ds/DS2411.pdf, and is hereby incorporated by reference. In the prior art, a controlling circuit such as RAID controller 112 would typically use a dedicated I/O line to interface with a serial number chip 130, such as the DS2411.

It should be noted that RAID controller 112, LED interface 114, and serial number circuit 130 are merely exemplary. One of skill in the art would recognize that the concepts described herein would work for any similarly configured controlling circuit needing to make dual use of a GPIO line.

A third external circuit, which in an exemplary embodiment comprises a voltage divider circuit 103, is disposed between GPIO line 111n and serial number circuit 130. As described more fully below in conjunction with FIG. 2, voltage divider circuit 103 enables the dual use of GPIO line 111n. More specifically, voltage divider circuit 103 ensures that when RAID controller 112 operates GPIO line 111n in a serial transmit mode to control LED interface 114, serial number circuit 130 is maintained in an idle state. Conversely, when RAID controller 112 operates GPIO line 111n in an I/O mode, voltage divider circuit 103 permits communication with serial number circuit 130, allowing it to transmit its unique serial number to RAID controller 112, via GPIO line 111n.

Voltage divider circuit 103 is merely one example of a variety of circuits that can be used to selectively couple one of a plurality of circuits to the GPIO line, depending on the desired function of the input/output line. Various voltage varying, switching, multiplexing, and other circuits can also be used to operationally couple one or more of a plurality of circuits to the input/output line to perform a desired function.

To summarize the above described exemplary embodiment, GPIO line 111n is coupled to LED interface circuit 114 and serial number circuit 130. These two circuits must coexist and not interfere with each other when sharing GPIO line 111n. As described more fully below, voltage divider circuit 103 permits the sharing of line 111n by these two devices with different functions.

Controlling circuit 112 selectively determines which of two available functions it needs. In the embodiment described herein, RAID controller 112 uses GPIO line 111n more frequently for serial transmission of LED control signals to LED interface circuit 114. As noted above, the LED control signals represent the individual status of disks D0 through Dn that make up RAID array 105. LED interface circuit 114 drives an LED array (not shown) and is thus used to visually monitor disk status in RAID array 105. As such, this is a function which would typically be enabled by RAID controller 112.

On the other hand, in the embodiment described herein, serial number circuit 130 is used to provide a unique identity number to RAID controller 112. Such a function is only periodically used. For this reason, voltage divider circuit 103 is preferably designed so that when GPIO line 111n is being used to pass LED control signals to LED interface 114—i.e., when RAID controller 112 is in a serial transmit mode—serial number circuit 130 is maintained in an idle state. Conversely, when RAID controller 112 ceases to transmit LED control signals, serial number circuit 130 may be called on to relay a unique serial number to RAID controller 112. In this case, RAID controller 112 operates in an I/O mode.

Figure 2:
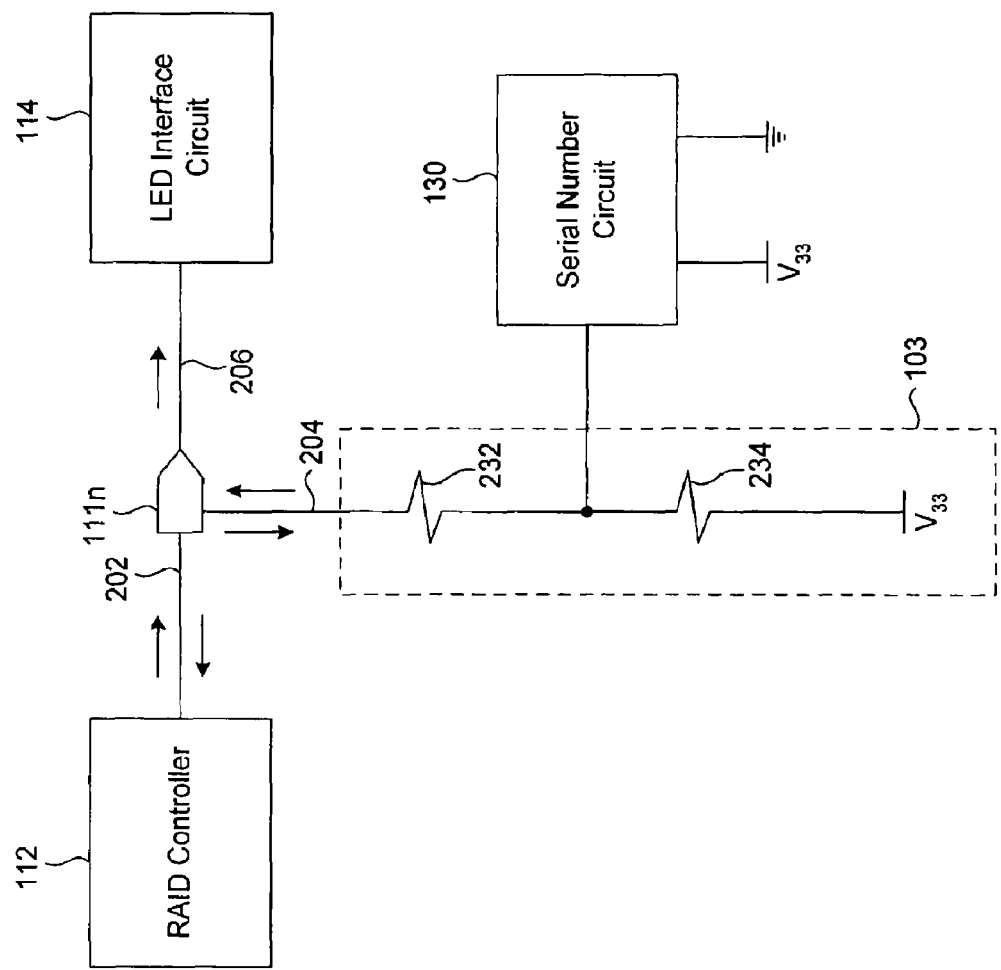
FIG. 2 is a circuit diagram illustrating an embodiment of the invention.

FIG. 2 more specifically illustrates the design of voltage divider circuit 103. Voltage divider circuit 103 comprises a first resistor 232 and a second resistor 234 that are coupled in series between the GPIO line 111n and a power supply $V_{33}$. Serial number circuit 130 is coupled in parallel to voltage divider circuit 103, between first resistor 232 and second resistor 234. In an exemplary embodiment, first resistor 232 is approximately one fifth the value of second resistor 234.

By way of example, assume first resistor 232 is 210Ω, while second resistor 234 is 1 kΩ. Also assume that power supply is $V_{33}$ is approximately 3.3 volts, while the LED control signals cycle between 0 volts (logic low) and 3.3 volts (logic high), depending on the status of the disks. As described above, in this embodiment, serial number circuit 130 is coupled to voltage divider circuit between the first and second resistor. The voltage between the first and second resistor will cycle between about 2.75 volts and 3.3 volts, depending on the value of the LED control signal—i.e., 0 volts or 3.3 volts. Because the idle state for the exemplary DS2411 chip is logic high, such a voltage cycle—i.e., 3.3-2.75 volts—is insufficient to trigger serial number chip 130. Thus, in this embodiment, 210Ω resistor 232 blocks the LED control signals from activating serial number chip 130. Serial number chip 130 thus remains in an idle state when RAID controller 112 is driving GPIO 111n in a serial transmit mode.

When RAID controller 112 requires access to the unique serial number available on serial number chip 130, it will temporarily stop transmitting the LED control signals. With no signal present, GPIO line 111n in can be placed in an I/O mode of operation. In the I/O mode of operation, GPIO line 111n is configured to be an open drain capable of sinking current. Such a configuration renders 210Ω resistor 232 essentially transparent, thereby allowing serial number circuit 130 to transmit its unique serial number to RAID controller 112.

The present invention has been described above with the aid of functional building blocks and method steps that illustrate the performance of specified functions and relationships thereof. The boundaries of these functional building blocks and method steps have been arbitrarily defined herein for the convenience of the description. Alternate boundaries can be defined so long as the specified functions and relationships thereof are appropriately performed. Any such alternate boundaries are thus within the scope and spirit of the claimed invention. One skilled in the art will recognize that these functional building blocks can be implemented by discrete components, application specific integrated circuits, processors executing appropriate software and the like or any combination thereof. Thus, the breadth and scope of the present invention should not be limited by any of the above-described exemplary embodiments, but should be defined only in accordance with the following claims and their equivalents.

We claim:

1. An input/output (I/O) line circuit, comprising:
   an I/O line selectively operable to transmit a serial data stream in a serial transmit mode or receive a signal in an I/O mode, wherein the I/O line transmits the serial data stream to a first external circuit coupled to the I/O line when the I/O line operates in the serial transmit mode; and
   an I/O line connector circuit connecting the I/O line to a second external circuit, wherein the I/O line circuit is configured to receive a signal from the second external circuit automatically in response to operation of the I/O line in the I/O mode.

2. The I/O line circuit of claim 1, wherein said I/O line connector circuit is a switching circuit coupled to said I/O line, wherein (i) when said I/O line operates in the serial transmit mode, said switching circuit prevents said I/O line from receiving a signal from the second external circuit, and (ii) automatically in response to operation of said I/O line in the I/O mode, said switching circuit permits said I/O line to receive a signal from the second external circuit.

3. The I/O line circuit of claim 1, wherein the switching circuit comprises a voltage divider circuit.

4. The I/O line circuit of claim 1, wherein said first external circuit is an LED interface circuit and the serial data stream comprises LED control signals.

5. The I/O line circuit of claim 1, wherein said second external circuit comprises a serial number device and the signal is a serial number.

6. The I/O line circuit of claim 2, wherein said switching circuit is configured to sink current when the I/O line is operating in the I/O mode.

7. The I/O line circuit of claim 2, wherein said switching circuit comprises:
   a voltage divider circuit having a first resistor coupled to said I/O line, a second resistor coupled in series to said first resistor, and a power supply coupled in series to said second resistor, and
   wherein said second external circuit is coupled in parallel with said second resistor.

8. The I/O line circuit of claim 7, wherein said first resistor is approximately ⅕ the value of said second resistor.

9. A method for controlling an input/output (I/O) interface, comprising:
   selectively operating an I/O line in a serial transmit mode or an I/O mode;
   coupling to a terminal of the I/O line a first circuit and transmitting a serial data stream from the I/O line to the first circuit when the I/O line operates in the serial transmit mode; and
   coupling to the terminal of the I/O line a connector circuit and a second circuit, and receiving at the I/O line, via the connecting circuit, a signal generated by the second circuit and transmitted to the I/O line automatically in response to operation of the I/O line in the I/O mode.

10. The control method of claim 9, further comprising:
   maintaining the second circuit in an idle state when the I/O line is operating in the serial transmit mode.

11. The control method of claim 9, wherein the first circuit is an LED interface circuit and the serial data stream comprises LED control signals.

12. The control method of claim 9, wherein the second circuit comprises a serial number device and the signal is a serial number.

13. An input/output (I/O) line circuit, comprising:
   an I/O line selectively operable in a serial transmit mode or an I/O mode;
   an I/O line terminal coupling to said I/O line a first external circuit that receives the serial data stream from said I/O line when said I/O line operates in the serial transmit mode, and coupling to the I/O line a second external circuit that generates and transmits a signal to said I/O line when said I/O line operates in the I/O mode; and
   a bridge circuit disposed between said I/O line terminal and the second external circuit, said bridge circuit comprising:
      a voltage divider circuit having a first resistor coupled to said I/O line terminal, a second resistor coupled in series to said first resistor, and a power supply coupled in series to said second resistor, the second external circuit being coupled in parallel with said second resistor.

14. The I/O line circuit of claim 13, wherein (i) when said I/O line operates in the serial transmit mode, said bridge circuit maintains the second external circuit in an idle state, and (ii) when said I/O line operates in the I/O mode, said bridge circuit permits the second external circuit to transmit the signal to said I/O line.

15. The I/O line circuit of claim 13, wherein the first external circuit is an LED interface circuit and the serial data stream comprises LED control signals.

16. The I/O line circuit of claim 13, wherein the second external circuit comprises a serial number device and the signal is a serial number.

17. The I/O line circuit of claim 13, wherein said I/O line circuit is capable of sinking current in the I/O mode.

18. The I/O line circuit of claim 13, wherein said first resistor is approximately ⅕ the value of said second resistor.

19. The I/O line circuit of claim 1, said I/O line connector circuit comprising a switching circuit coupled to said I/O line, wherein said switching circuit is configured (i) to prevent said I/O line from receiving a signal from the second external circuit when said I/O line operates in the serial transmit mode, and (ii) to permit said I/O line to receive a signal from the second external circuit in response to operation of said I/O line in the I/O mode.

20. A method for controlling an input/output (I/O) interface between an I/O line, a first circuit coupled to a terminal of the I/O line, and a second circuit coupled to the terminal of the I/O line, the method comprising:
   selectively operating the I/O line in a serial transmit mode or an I/O mode;
   transmitting a serial data stream from the I/O line to the first circuit when the I/O line operates in the serial transmit mode; and
   automatically in response to operation of the I/O line in the I/O mode, receiving at the I/O line from the second circuit a signal generated at the second circuit and transmitted to the I/O line in response to operation of the I/O line in the I/O mode.

* * * * *